United States Patent [19]

Williams et al.

[11] Patent Number: 5,412,589

[45] Date of Patent: May 2, 1995

[54] SYSTEM FOR DETECTING REDUCED INTERFERENCE TIME-FREQUENCY DISTRIBUTION

[75] Inventors: William J. Williams; Jechang Jeong, both of Ann Arbor, Mich.

[73] Assignee: University of Michigan, Ann Arbor, Mich.

[21] Appl. No.: 899,224

[22] Filed: Jun. 16, 1992

Related U.S. Application Data

[63] Continuation of Ser. No. 496,996, Mar. 20, 1990, abandoned.

[51] Int. Cl.$^6$ .............................................. G06F 15/20
[52] U.S. Cl. ................................................ 364/728.06
[58] Field of Search ...................... 324/77 G; 333/156; 364/728.06, 824

[56] References Cited

U.S. PATENT DOCUMENTS

| | | | |
|---|---|---|---|
| 3,681,530 | 8/1972 | Manley et al. ................... | 381/41 X |
| 4,781,460 | 11/1988 | Bott ................................. | 250/574 X |
| 4,783,640 | 11/1988 | Reynolds et al. ................ | 333/156 |
| 4,802,491 | 2/1989 | Cohen et al. .................... | 364/413.06 X |
| 4,982,150 | 1/1991 | Silverstein et al. .............. | 324/77 G |

*Primary Examiner*—Edward R. Cosimano
*Attorney, Agent, or Firm*—Rohm & Monsanto

[57] ABSTRACT

A system including method and apparatus for determining the energy content in a signal to be analyzed employs, in an apparatus aspect thereof, a sampling element for producing samples of the electrical signal to be analyzed, a local correlator for producing a plurality of signals corresponding to the samples delayed and multiplicatively combined with their complex conjugates, a bank of delay and adder systems for correlating the outputs of the multipliers in accordance with a binomial kernel, and a Fourier transformer for producing the distribution as a function of time and frequency. Local correlation is effected using a multi-element delay system, such as a shift register. Binomial correlation in the delay and adder systems is achieved by combining additively given samples with samples which are in other states of delay. Moreover, the banks have respectively different numbers of such delay and adder systems. The resulting analytic signal corresponds to a binomial kernel.

41 Claims, 13 Drawing Sheets

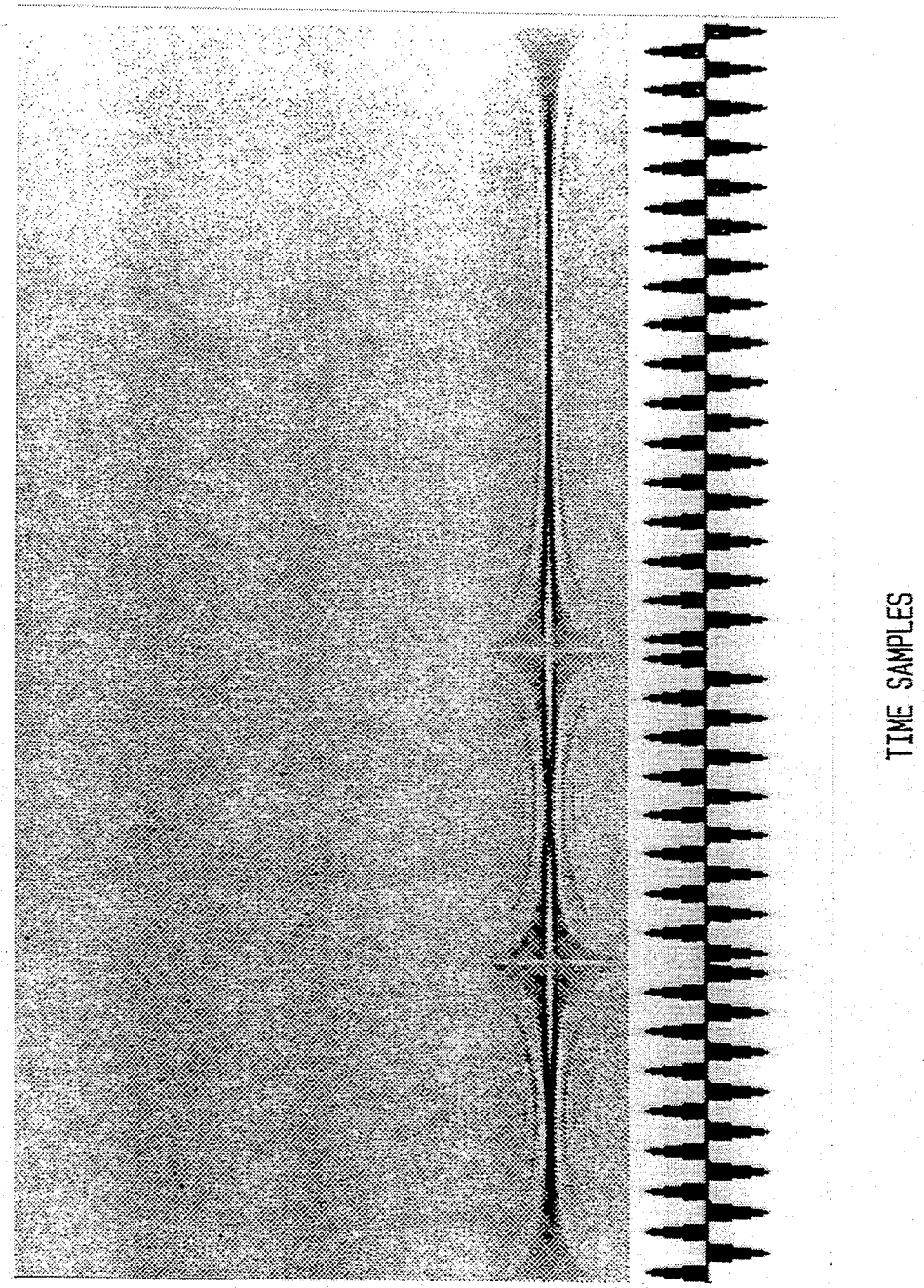

TIME SAMPLES

TIME SAMPLES

SYSTEM FOR DETECTING REDUCED INTERFERENCE TIME-FREQUENCY DISTRIBUTION

This application is a continuation of application Ser. No. 07/496,996 filed on Mar. 20, 1990, now abandoned.

BACKGROUND OF THE INVENTION

This invention relates generally to systems for determining the time-frequency distributions of energy in signals, and more particularly, to systems and apparatus for measuring the energy in signals as a function of frequency and time. The present invention pertains to a signal analysis system which achieves time-frequency distributions, or representations having high resolution with reduced interference from the effects of cross-terms, and which can be realized efficiently in integrated circuitry.

Fourier transformation has long been recognized as a simple and convenient technique for decomposing a signal into its individual frequency components, and obtaining an indication of the intensity of the signal at each such frequency. Conventional Fourier analysis, whether conducted mathematically or in any of several commercially available circuit systems, produces a representation of the frequency distribution of a signal without indicating the time at which the frequencies occurred. Thus, if a signal which has a slowly varying frequency content is Fourier analyzed, the changes in the frequency content of the signal over time would not be evident. One useful and well-known approach to the difficulty discussed above is to analyze the slowly varying signal for small periods of time during which it can be assumed that the signal does not contain rapid changes. In the context of a slowly varying signal, this window concept will provide a useful indication of the variations over time. The duration of the window during which the slowly varying signal can be analyzed can be shortened in response to the rate of change in the frequency content of the signal.

The well-known spectrogram and the short-time Fourier transform are techniques which utilize the window concept, and have become standard techniques in the art. These known systems, however, are not useful in situations where the energy, or spectral, content of the signal varies with such rapidity that the signal cannot reasonably be considered to be stationary for almost any window duration. In this regard, it is to be noted that as the duration of the window is decreased, the frequency resolution of the system is also decreased.

The shortcomings of the spectrogram and the short-time Fourier transform have not prevented these techniques and their variations from becoming essential tools in the technology of signal analysis, but have prompted other work in the development of distributions which are joint functions of time and frequency. The thrust of that effort is to generate a description of the energy density, or intensity, of the signals to be analyzed simultaneously in frequency and time. Clearly, the resulting representation would be a multi-variable representation, and would be of significant benefit in the devising of signals which exhibit desirable time-frequency properties.

Numerous individuals in the prior art have studied the difficulties associated with achieving a simple, yet effective, time-frequency distribution system, one of the most notable being that which has been named after Wigner. The various distributions which have been proposed in the literature have been shown to behave in ways which are dramatically different from one another. Although many of the known distributions have characteristics which satisfy generally accepted criteria, the differences in their behavior have impeded development of a consistent theory. The lack of a consistent theory, however, did not impede development of a generalized analytical approach from which an infinite number of distributions can be derived. The generalized expression is as follows:

$$P(t,\omega) = \frac{1}{4\pi^2} \iiint e^{-j\theta t - j\tau\omega + u\theta u} \phi(\theta,\tau) \underline{s^c\left(u - \frac{1}{2}\tau\right) s\left(u + \frac{1}{2}\tau\right)} du\, d\tau\, d\theta$$

In the above expression, the underlined portion has been termed the "kernel" and it is recognized that the character of the distribution may be changed by changing the kernel.

The foregoing notwithstanding, it is now recognized that signals of practical interest often do not conform to the requirements of realistic application of Fourier principles. The Fourier approach works best when the signal of interest is composed of a number of discrete frequency components so that time is not a specific issue. Such would be the case, for example, in a constant frequency sinusoid, or somewhat paradoxically, when the signal exists for a very short period of time so that its time of occurrence is considered to be known. An impulse function is such a signal. Nevertheless, with respect to signals which typically are encountered in practical applications, most such signals cannot be satisfactorily represented, and generally have been considered to be suspect, requiring them either to be forced into the mold, or abandoned.

It has been quite difficult to handle non-stationary signals, such as chirps, using conceptualizations based on stationarity. As indicated, the spectrogram represents an effort to apply the Fourier transform for a short-time analysis window, within which it is hoped that the signal behaves reasonably within the requirements of stationarity. Moving the analysis window in time along the signal, one hopes to track and capture the variations of the signal spectrum as a function of time. If the analysis window is made short enough to capture rapid changes in the signal, it becomes impossible to resolve frequency components which are close in frequency during the analysis window duration.

The well-known Wigner distribution has many important and interesting properties, and provides a high resolution representation in time and in frequency for a non-stationary signal, such as a chirp. In addition, this distribution has the important property of satisfying desired time and frequency marginals. The term "marginal" is obtained from probability theory to indicate an individual distribution. The marginals are derived from the joint distribution by integrating out the other variables.

The Wigner distribution suffers from significant disadvantages. For example, its energy distribution is not non-negative and it often is characterized with severe cross terms, or interference terms, between components in different time-frequency regions. This leads to serious confusion and misinterpretation. The absence of negativity of the energy value is a highly desirable property, which is present in the spectrogram, but not the Wigner distribution. The property of being characterized with proper time and frequency marginals is also highly desirable, and such is the case with the Wigner distribution, but not the spectrogram.

After investigation by many persons of skill in the art, the principle faults of negativity and cross terms have been considered to be facts of life which only can be dealt with by performing additional computations. There is a need for a system for determining time-frequency distributions which have high resolutions in time and frequency and which have considerably reduced cross, or interference terms.

The Choi-Williams distribution was one such attempt. The Choi-Williams distribution, however, requires an enormous amount of computation in practical implementation. The present invention provides a new time-frequency distribution that has a good time-frequency behavior, and a fast computational algorithm as well.

OBJECTS OF THE INVENTION

There is, therefore, a need in the present state of the art for a system for implementing high resolution time-frequency distributions.

There is a need in the present state of the art for a system which achieves time-frequency distributions with reduced or no interference from cross terms between multiple signal components.

There is also a need in the present state of the art for a simple system for determining the energy content of a signal.

There is a further need in the present state of the art for a computer-implemented system for realizing time-frequency energy distributions.

There is additionally a need in the present state of the art for a system for analyzing the time-frequency energy distribution of signals which are not stationary, such as chirps.

There is yet a further need in the present state of the art for a system for analyzing the time-frequency energy distribution of signals which change rapidly.

There is also another need in the present state of the art for a system which achieves frequency-time distributions without aliasing distortion.

There is yet an additional need in the present state of the art for a high resolution time-frequency distribution using a binomial kernel that performs a fast, recursive, real-time computation of the time-frequency distributions.

There is still another need in the present state of the art for a system which computes time-frequency distributions using shift and add, or delay and add, operations in computing local autocorrelations.

There is a yet further a system which is adaptable to compute time-frequency distributions using VLSI architecture using shift and add or delay and add in computing local autocorrelations.

There is also a further need in the present state of the art for a system for generating high resolution time-frequency distributions which utilizes a binomial kernel having excellent properties and which can serve in an algorithm which is specifically adapted for fast, recursive computation of the time-frequency distributions.

There is additionally another need in the present state of the art for a system which can be used to obtain time-frequency distributions of signals associated with phase shift keying (PSK) communication.

There is yet another need in the present state of the art is for a pipelined computation of time-frequency distributions.

A still further need in the present state of the art is for a system which can be used to obtain time-frequency distributions of signals associated with frequency shift keying (FSK) communication.

An additional need in the present state of the art is for a system which measures energy content of signals as a function of frequency and time.

Yet another need in the present state of the art is for a system which can perform an analysis of electrical signals which represent or are derived from other phenomena, such as sound waves, surface variations, mechanical vibrations, surface roughness, chemical activity, pressure, temperature, and variations in light intensity.

Another need in the present state of the art is for a system of time-frequency distributions which is not confusing or otherwise difficult to interpret.

BRIEF SUMMARY OF THE INVENTION

The foregoing and other objects are achieved by this invention which provides in an apparatus aspect of the invention, a system for determining an energy distribution in an electrical signal. In accordance with the invention, the local time autocorrelation of a signal is formed. This signal may be of the real or analytic form. The real form of the signal is used to generate time-frequency energy distributions by using a plurality of delayed samples of the signal in analog or digital form to produce a plurality of local autocorrelation signals corresponding to combinations of the samples of the signal, then subjecting the autocorrelation signals to Fourier or similar transformation for producing the time-frequency energy representation. In certain cases it may be advantageous to use the analytic form of the signal instead of the real valued form. In accordance with the invention, a first signal is coupled to a transformer which effects a Hilbert transformation. The transformer receives the first signal and provides at an output thereof the first signal after a predetermined time delay. A second output is provided for producing a second signal which corresponds to the first signal transformed in accordance with the Hilbert transformation. An energy distribution signal generator receives the first signal delayed and the transformed second signal, and produces at an output thereof a distribution signal which corresponds to the energy content of the electrical signal to be analyzed.

In some cases, the signal is digitally sampled. Prior to subjecting the electrical signal to be analyzed to the sampling device, the signal is passed, in certain embodiments of the invention, through a low-pass filter which prevents aliasing. The low-pass filter is coupled at its output to the input of the sampling device, which may be an analog-to-digital converter. In this embodiment of the invention, the energy distribution signal generator has incorporated therein a time delay which advantageously may be in the form of a shift register. Preferably, the shift register is advanced at a rate which is responsive to the rate of operation of the sampling device. In addition, the time delay is provided with a plurality of outputs, each of which has associated therewith a respective time delay which is less than the overall delay corresponding to the time required to achieve the Hilbert transformation, as would be the case at the intermediate stages of a shift register. The outputs provide respective weighted samples of the electrical signal to be analyzed. As indicated, however, the overall predetermined time delay provided by the transformer (at the last output of the shift register in this specific illustrative embodiment) corresponds approximately to the duration of the Hilbert transformation.

In a further embodiment of the invention, the energy distribution signal generator contains a finite impulse response (FIR) filter which performs the Hilbert transformation. Additionally, a Fourier transformer is used to produce at an output thereof the distribution signal. The Fourier transformer may be a hermitian-to-real fast Fourier transformer (FFT) which Fourier transforms Hermitian (or conjugate symmetrical) input data into real output data. The hermitian-to-real FFT ensures that, in certain embodiments, the distribution signal is real. This obviates the need to compute the imaginary values. In some embodiments, however, certain ones of the frequency components in the energy distribution signals may be produced as the imaginary portions of the distribution signal. The Fourier transform may be replaced by the Hartley or Cosine transforms as long as the replacements give the equivalent results to that of the Fourier transform.

In accordance with a method aspect of the invention, energy distribution signals which correspond to the spectral energy content of an electrical signal to be analyzed are generated by the steps of capturing periodically a plurality of time samples of the electrical signal to be analyzed, forming a plurality of autocorrelation signals corresponding to combinations of the time samples, and subjecting the autocorrelation signals to Fourier transformation for producing the energy distribution signals.

As indicated hereinabove, prior to performing the step of capturing the time samples of the electrical signals to be analyzed, there is provided in one embodiment of the invention the further step of subjecting that electrical signal to a low pass filter. By this step, aliasing is prevented.

Incorporated in the step of forming a plurality of autocorrelation signals are the further steps of:

first delaying the electrical signal to be analyzed by a predetermined period of time in a plurality of delay members, the predetermined period of time corresponding to a respectively associated delay period which corresponds to a respective multiple of the period of repetition of the step of capturing, whereby the electrical signal to be analyzed is produced at a plurality of respective outputs of the delay members as respective first signals;

multiplying each of the respective first signals by a respective other one of the first signals to produce a corresponding plurality of product signals;

further delaying each of the product signals to produce respective sequences of delayed product signal samples; and adding to at least some of the delayed product signal samples a prior sample of itself.

In a highly advantageous embodiment of the invention, the step of first delaying is performed in a shift register which, as indicated, is clocked. The rate at which the shift register is advanced, in a particularly advantageous embodiment of the invention, corresponds to the rate at which samples are captured in the step of capturing periodically a plurality of time samples of the electrical signal to be analyzed.

In a further embodiment of the invention, prior to performing the step of multiplying there is provided the further step of forming a complex conjugate of the electrical signal to be analyzed. Preferably, this step is followed by the step of further multiplying at least one of the first signals by the complex conjugate. Conjugation may be performed simply by reversing the sign (polarity) of the imaginary sequence portion of the delayed and Hilbert transformed electrical signal to be analyzed.

The step of multiplying is performed, in a still further embodiment, by a singular multiplication element. In such an embodiment, there are provided the further steps of multiplexing the first signals to form a sequence thereof at an input of the singular multiplication element, and demultiplexing a sequence of product signals at an output of the singular multiplication element.

The step of subjecting the autocorrelation signals to Fourier transformation may include, in certain embodiments, the step of subjecting the autocorrelation signals to a hermitian-to-real fast Fourier transformation. This ensures that the energy distribution signals are real. However, a complete Fourier transformation may be performed, and in such instances, the energy distribution signals which are produced at respective outputs of the Fourier transformer correspond to two frequency components. More specifically, each of the outputs has real and imaginary components, the real component containing energy distribution information pertaining to a first frequency component, and the imaginary component containing energy distribution information pertaining to another, preferably adjacent, frequency component. These output signals may be employed to control a display, a printer, or any other device which will provide visual indication to the user of the spectral energy content of the electrical signal to be analyzed.

In accordance with a further method aspect of the invention, a method of generating energy distribution signals corresponding to the spectral energy content of an electrical signal to be analyzed comprises the steps of:

capturing periodically a plurality of time samples of the electrical signal to be analyzed;

combining multiplicatively delayed ones of the samples to form a plurality of sequences of product signal samples;

combining product signal samples additively within each of the sequences of product signal samples, for forming from each such sequence an autocorrelation signal; and subjecting the autocorrelation signals to Fourier transformation for producing the energy distribution signals.

In accordance with a specific embodiment of this further method aspect, prior to performing the step of combining multiplicatively there is provided the further step of multiplexing the time samples of the electrical signal to be analyzed. Additionally, prior to performing the step of combining product signal samples additively there is provided the further step of demultiplexing the sequences of product signal samples. These steps of combining multiplicatively delayed ones of the samples and combining product signal samples additively form the overall step of autocorrelating the electrical signal to be analyzed in accordance with a binomial mathematical expression of the form:

$$\psi(m,k) = \binom{k}{m} 2^{-k}, m = 0, 1, \ldots k, \text{ and } k = 0, 1, 2, \ldots N$$

where the mathematical expression corresponds to a binomial kernel. The autocorrelations computed by the binomial kernel may be multiplied by a tapering window function in order to avoid "ringing" effects caused by abrupt truncation of the autocorrelations.

In accordance with a further method aspect of the invention, phase transitions in an information signal modulated under a phase shift keying modulation scheme, are detected by operation of the following steps:

storing in a memory data corresponding to a reference time-frequency slice characteristic of a predetermined event in an information signal;

capturing periodically a plurality of time samples of the information signal;

combining multiplicatively delayed ones of the samples to form a plurality of sequences of product signal samples;

combining product signal samples additively within each of the sequences of product signal samples, for forming from each such sequence an autocorrelation signal;

subjecting the autocorrelation signals to Fourier transformation for producing energy content signals containing information responsive to the phase transitions, the energy content signals being functionally related to time and frequency;

extracting a subject time-frequency slice of the energy content signals; and comparing the subject time-frequency slice against the reference time frequency slice stored in the memory.

The step of comparing includes the step of subtracting the subject time-frequency slice from the reference time frequency slice stored in the memory to produce a sequence of difference values. Additionally, the step of comparing includes the further steps of squaring the difference values and summing the squared difference value. The summed squared difference values are then compared against a threshold value.

In a method aspect of the invention which is directed to the extraction of information from an information signal which has been modulated in accordance with a frequency shift keying modulation scheme, the method comprises the steps of:

capturing periodically a plurality of time samples of the information signal;

combining multiplicatively delayed ones of the samples to form a plurality of sequences of product signal samples;

combining product signal samples additively within each of the sequences of product signal samples, for forming from each such sequence an autocorrelation signal;

first subjecting the autocorrelation signals to Fourier transformation for producing a plurality of energy content signals at respective frequency-related outputs;

combining subtractively respective pairs of the energy content signals for producing respective difference signals; and second subjecting each of the difference signals to a respective threshold element for producing an output bit stream.

In performing the step of combining subtractively, the respective pairs of the energy content signals are, in certain embodiments, adjacent to one another in frequency. As previously noted, the information in the energy content signals, which is in the form of the output bit stream, can be employed to control a display device, a printing device, or any of several other known indicator systems.

In accordance with a further apparatus aspect of the invention, a system is provided for producing a time-frequency distribution corresponding to an electrical signal to be analyzed. The electrical signal is of the type having a spectral characteristic which is desired to be analyzed with respect to time. In accordance with the invention, a sampling element produces time samples of the electrical signal to be analyzed. The time samples are provided to a local correlator for producing an autocorrelated signal. In a preferred embodiment, the local correlator is formed of a plurality of delay elements arranged in sequence for producing cumulative delay of the time samples, and a plurality of multipliers for combining multiplicatively respective ones of the time samples with others of the time samples in other states of delay, and producing a locally correlated sequence of samples. There is further provided a binomial transformer formed of a plurality of correlator elements, the binomial transformer being formed of a plurality of banks of the correlator elements, each of the banks being associated with a respective one of the plurality of multipliers.

In a specific embodiment of the invention, the correlator elements in the binomial transformer means are each formed of delay elements for delaying in time a sample in the associated locally correlated sequence of samples, and a combiner for combining ones of the samples in the correlated sequence of samples with others of the samples in the correlated sequence of samples in other states of delay. Each of the combiners is provided with an adder for combining the samples additively.

Each of the banks of the correlator elements has a respective, different number of the correlator elements arranged sequentially therein. In one practical embodiment, the numbers of the correlator elements in the banks differ sequentially by one correlator element. Additionally, there is provided a plurality of delay members, each arranged sequentially intermediate of respectively associated ones of the banks and the multipliers.

A conjugate former is provided for forming a conjugate of the cumulatively delayed time samples, the conjugate being combined multiplicatively in the multipliers. In a complex system having real and imaginary components, the conjugate may be formed by inverting the sign of the imaginary component.

As previously discussed, a Fourier transformer is coupled to the binomial transformer for producing the time-frequency distribution. The Fourier transformer may be a Hermitian-to-real FFT.

It is a significant advantage of the present invention that the plurality of delay elements in the local correlator means comprise respective stages of a shift register.

Thus, the combination of shift registers, adders, and multipliers can easily be implemented in VLSI structure.

BRIEF DESCRIPTION OF THE DRAWING

Comprehension of the invention is facilitated by reading the following detailed description, in conjunction with the annexed drawing, in which:

FIG. 8 is a representation of a time-frequency profile of a PSK signal, showing transitions, wherein the information is extracted in accordance with the present invention, the signal samples being shown therebelow;

DETAILED DESCRIPTION

Figure 1:
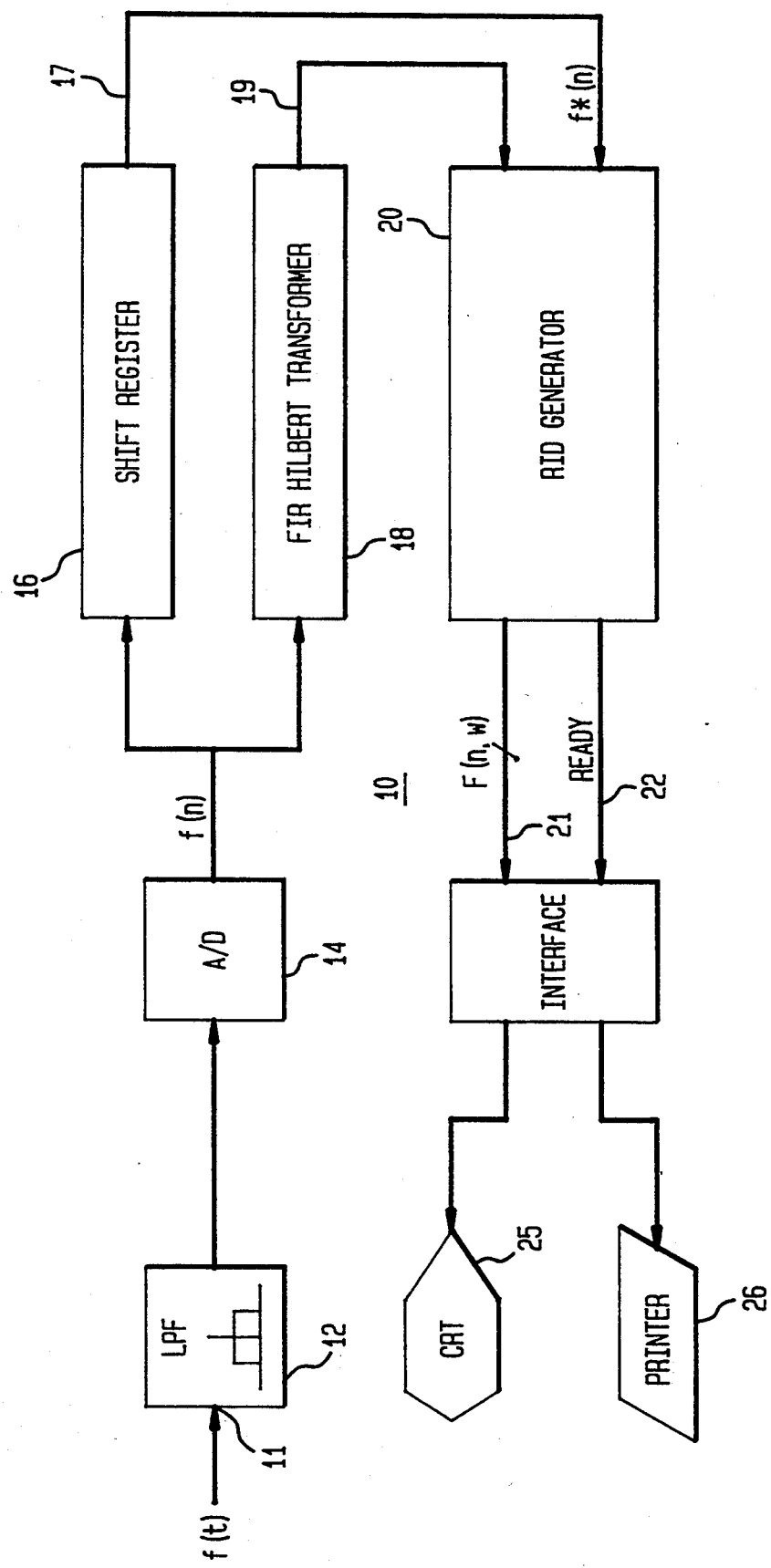
FIG. 1 is a block and line representation of a real-time time-frequency analysis system constructed in accordance with the principles of the invention.

FIG. 1 is a block and line representation of a real-time time-frequency analysis system constructed in accordance with the principles of the invention. This figure depicts the stages in a specific illustrative embodiment of the invention for producing a time-frequency representation of an electrical signal to be analyzed.

As shown in this figure, real-time time-frequency analysis system 10 receives an electrical signal to be analyzed, f(t), at an input 11 of a low-pass filter 12. Low-pass filter 12 prevents aliasing distortion, and is coupled at its output to an analog-to-digital convertor 14. In one highly advantageous embodiment of the invention, analog-to-digital converter 14 produces at its output digital samples f(n). Thus, analog-to-digital converter 14 operates as a sampling device, and produces a sequence of samples responsive to f(t). Instead of digital sampling, analog or optical delays can be used in which the analog-to-digital converter is unnecessary.

Digital samples f(n) are divided into two identical sequences and supplied to a shift register 16 and a finite impulse response (FIR) Hilbert transformer 18. Hilbert transformer 18, by its design, implements a Hilbert transformation which, in this specific embodiment, is achieved digitally. Shift register 16 delays digital samples f(n) so that the delayed signal at output 17 of the shift register is synchronized with the signal at output 19 of Hilbert transformer 18. These two signals together comprise what is termed the "analytic signal," f*(n). Thus, f*(n) is the analytic signal for f(n).

The analytic signal is conducted to a reduced interference distribution (RID) generator 20 which produces at outputs 21 and 22 thereof signals corresponding to a time-frequency representation. More specifically, the signal at output 21, F(n,w), is a function of time and frequency, since as will be described hereinbelow, RID generator 20 implements a Fourier transformation.

In this specific illustrative embodiment of the invention, the signals at outputs 21 and 22 of RID generator 20 are conducted to an interface 24 which produces a time-frequency representation which can be displayed on a CRT 25, a printer 26, or any other device which can provide to the user of system 10 a visual indication of the energy distribution of the electrical signal to be analyzed. It is to be understood, however, that the analytic signal can be used for any purpose for which such signals are presently used in the art, and therefore the utility of the present invention is not limited to forming displays of time-frequency distributions.

Figure 2:
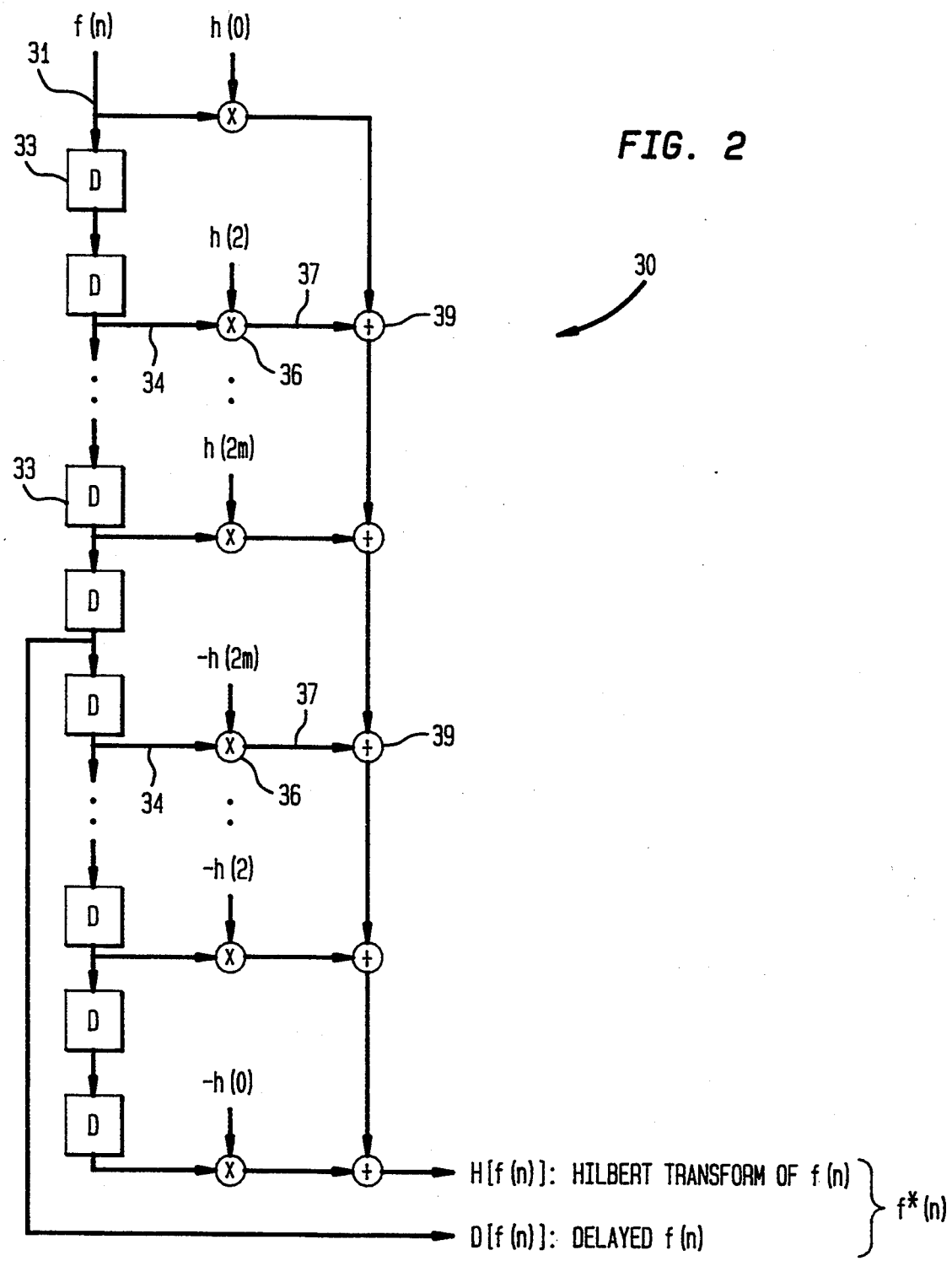
FIG. 2 is a block and line representation of a combined shift register and FIR Hilbert transformer for producing an analytic signal.

FIG. 2 is a block and line representation of an analytic signal generator 30 in which are combined a shift register and a FIR Hilbert transformer. This system receives f(n) at an input 31 thereof and converts same into an analytic signal f*(n). As can be seen, this system is formed of a delayed bank formed of delay elements 33 with delay samples being tapped at outputs 34. The delay samples are combined in multipliers 36 with respective components, h(n), of the impulse response of the Hilbert transformer. Each multiplier 36 provides at respective output 37 a weighted sample which is formed by the multiplicative combination of the delay sample and the respective component of the impulse response of the Hilbert transformer. The weighted samples are then combined additively in respective adders 39 to produce the Hilbert transformed results, H[f(n)].

It is to be understood that the delay stages, the weightings, and the summings could be realized using an analog tapped delay structure (not shown) with operational amplifiers (not shown) employed to apply the weighting and a multi-input operational amplifier to accomplish the summing. Alternatively, the delays, the weighting, and the summations could be accomplished with standard digital hardware, or a general purpose computer, and the result would be represented digitally. In this regard, it is noteworthy that shift register 16 in FIG. 1 is implemented inherently as the delay bank formed by delay elements 33. In this specific illustrative embodiment of the invention, analytic signal f*(n) is a complex valued sequence, and the real and imaginary parts must be stored and handled in separate parallel registers (not shown). In certain embodiments of the invention, it is particularly advantageous to use a computer with parallel or pipelined arithmetic capabilities.

Figure 3:
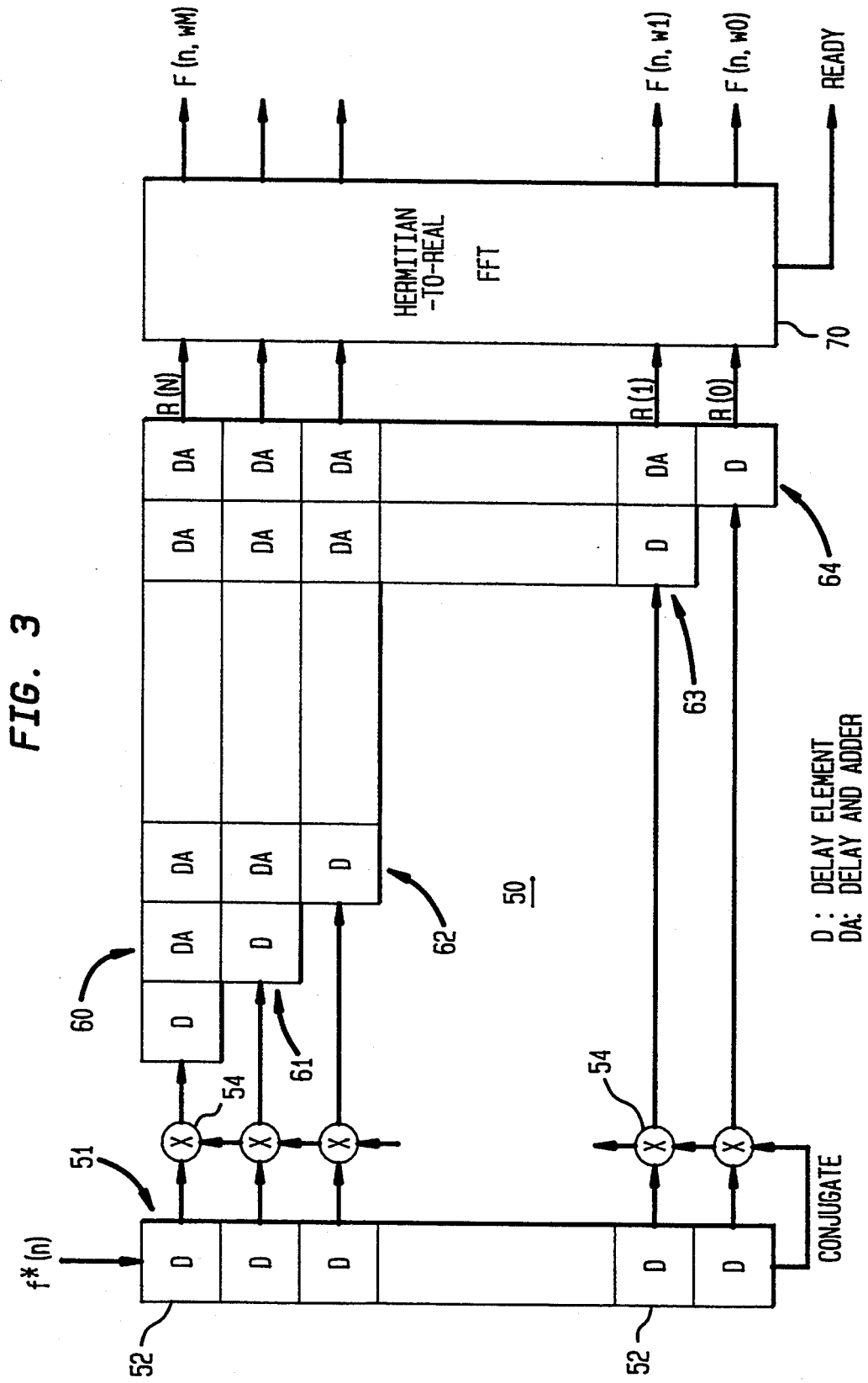
FIG. 3 is a block and line representation of a high speed parallel structure of a system constructed in accordance with the invention for generating reduced interference energy distribution signals.

Analytic signal f*(n) generated by analytic signal generator 30 in FIG. 2 is supplied to RID generator 50 which is shown in FIG. 3, and represented functionally as RID generator 20 in FIG. 1. Referring to FIG. 3, RID generator 50 forms the local autocorrelation of the analytic signal sequence by multiplying delayed samples of f*(n) by its complex conjugate. The analytic signal is provided to a delay bank 51 which is formed of a plurality of delay elements 52. Each delay element 52 has an output which is coupled to an input of a respective multiplier 54. Conjugation is achieved by reversing the sign of the imaginary sequence portion of f*(n).

FIG. 3 further shows a plurality of delay (D) and delay-adder (DA) banks 60-63. As shown, each of these banks has a D element followed sequentially by one or more DA elements. Successive ones of the banks have sequentially decreasing numbers of DA elements until bank 63 which has only one DA element. The sequence is terminated by a bank 64 which does not have a DA element. With this structure, the RID generator imposes a binomial weighting on the local autocorrelation available at the output of the multiplier units. Each of banks 60-64 produces and output corresponding to one of R(0) through R(n), which emerge at each clock tick for each timing pulse. These signals correspond to binomial weightings by virtue of the structures of the banks.

Output signals R(0) through R(n) are conducted to a conventional fast Fourier transformer (FFT) 70, which converts the weighted correlation values into a frequency spectrum for the particular instant in time. Thus, the outputs of FFT 70, which are designated in the drawing as F(n,w0) through F(n,wM) correspond to a time slice through the time-frequency surface.

Figure 4:
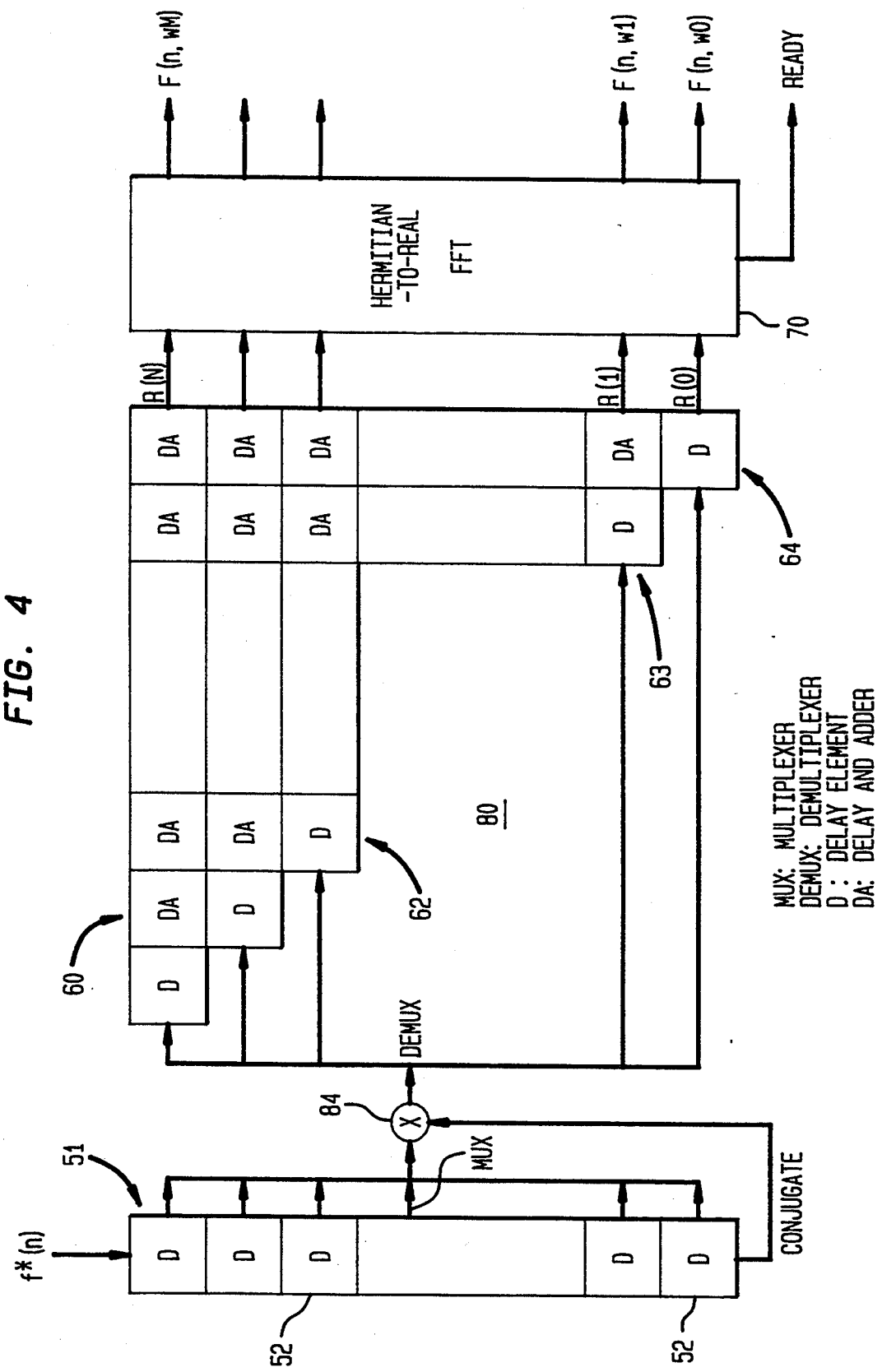
FIG. 4 is a block and line representation of a serial structure employing a single multiplier, constructed in accordance with the invention for generating reduced interference energy distribution signals.

FIG. 4 is a block and line representation of a further specific illustrative embodiment of RID generator 80 wherein, contrary to the parallel structure of multipliers 54 shown in FIG. 3, the embodiment of FIG. 4 employs a single multiplier 84. Elements of structure in the embodiment of FIG. 4 which bear analogous correspondence to the structural elements set forth in FIG. 3, are similarly designated.

Referring to FIG. 4, the outputs of delay elements 52 are multiplexed prior to being combined multiplicatively with the complex conjugate in multiplier 84. This requires that the output of the multiplier be demultiplexed to provide respective signals to banks 60-64 (a total of N+1 banks).

Figure 5:
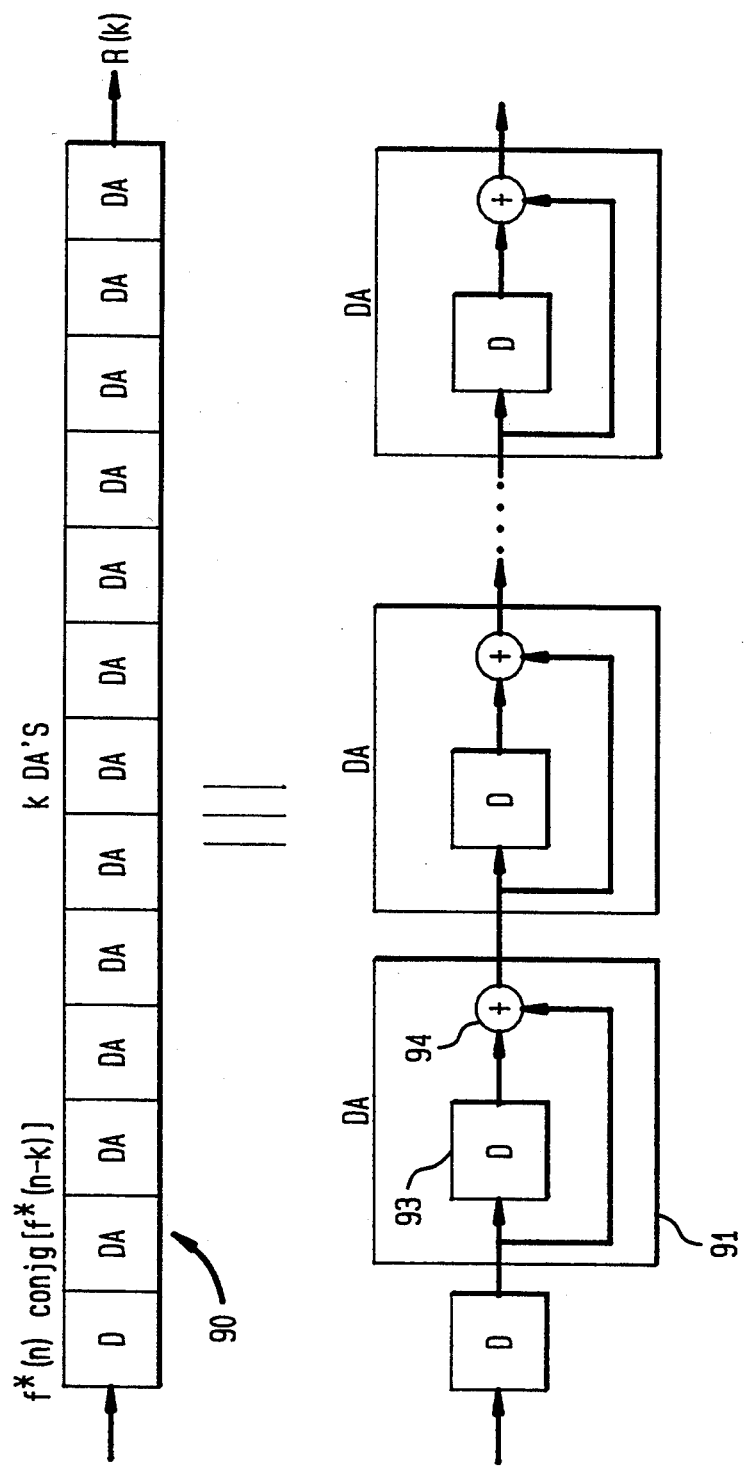
FIG. 5 is a block and line representation of a binomial computation unit which is employed as a D-DA-DA- . . . bank in FIGS. 3 and 4 for producing one of the N signals corresponding to R(k), where k=0, 1, . . . , N.

FIG. 5 is a block and line representation which shows the details of the DA elements in banks 60-63 in FIG. 4. As shown in FIG. 5, bank 90 has one D element and k DA elements. Thus, its output signal is represented as R(k). This figure illustrates that each DA element is formed of a delay (D) element arranged in combination with an adder. Thus, DA element 91 contains a D element 93 which supplies its output to an adder 94. Adder 94 combines the original input to D element 93 with the output of that D element to produce a signal which is conducted to the next DA element.

Referring for the moment to FIGS. 3 and 4, it is to be noted that FFT 70 is conventional and well-known. The hardware could be analog or digital in nature. If analog, the Fourier transform could be achieved optically. Integrated circuitry is commercially available for performing the FFT digitally.

Figure 6:
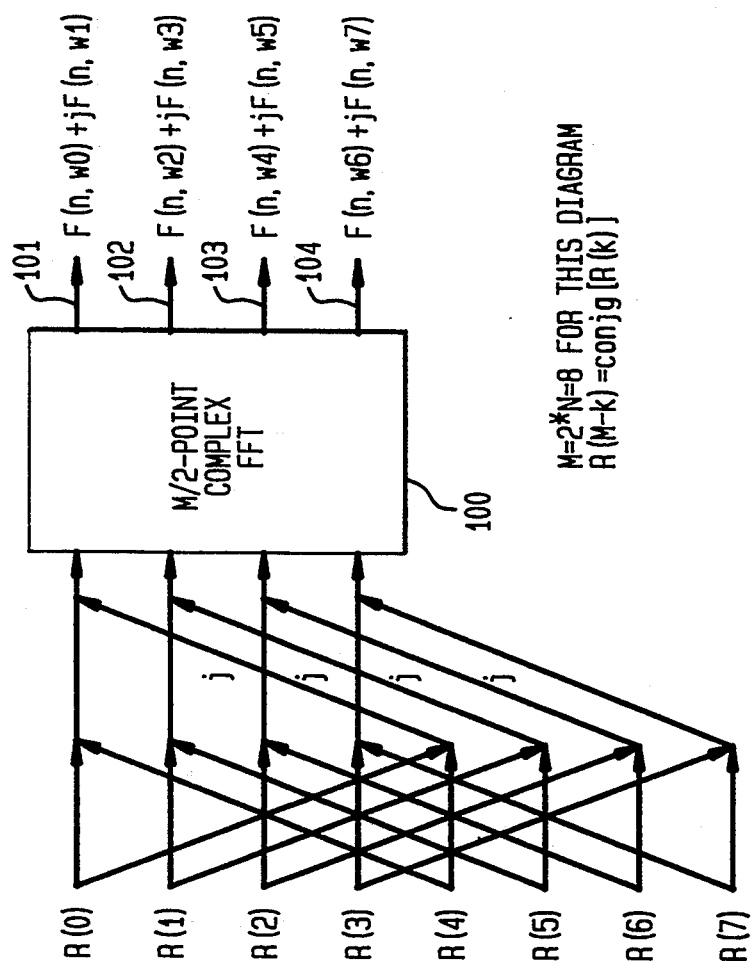
FIG. 6 is a representation of a system which implements a hermitian-to-real FFT, wherein certain ones of the frequency components are present in the imaginary signal components.

FIG. 6 is a block and line representation of an efficient implementation of the Hermitian-to-real FFT, which can be employed in the embodiments of FIGS. 3 and 4. Referring to FIG. 6, signals R(0) through R(7) are combined with one another, and their signs are inverted to effect conjugation. The eight R(k) signals are therefore combined to produce only four (k/2) signals which are provided to a M/2 point complex FFT 100. FFT 100 receives the four complex inputs and issues at respective outputs four complex outputs. As shown, outputs 101-104 have real and imaginary components, each such component containing information pertaining to a respective frequency component. Thus, for example, output 101 produces both, F(n,w0) for its real component and F(n,w1) for its imaginary component.

Figure 7:
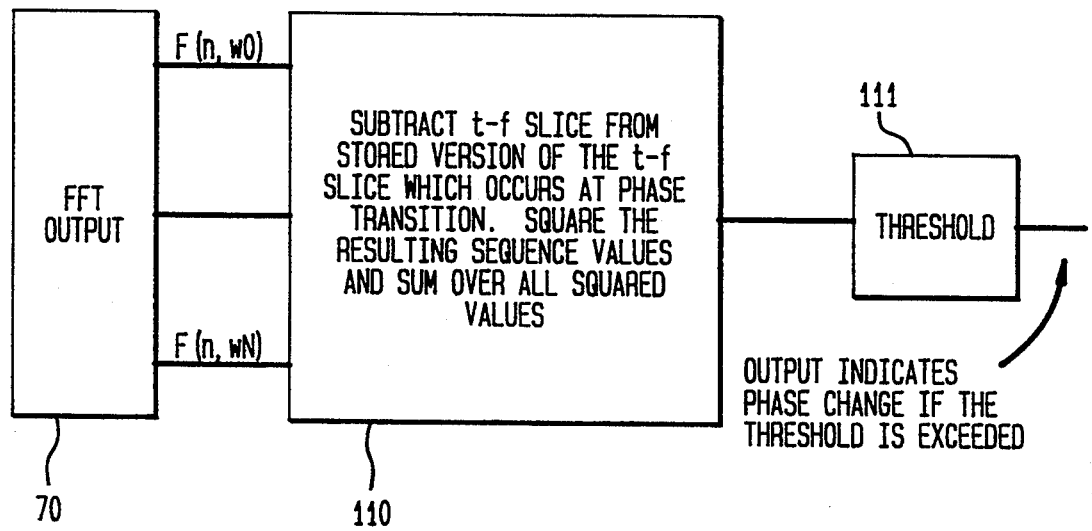
FIG. 7 is a block and line representation of a system which is useful for detecting phase transitions, so as to be useful in PSK demodulation.

FIG. 7 is a block and line representation of a system which is useful for detecting phase transitions, such as in PSK demodulation. As shown, the output of FFT 70 is conducted to a function block 110 which performs a plurality of functions. This function block contains a memory (not shown) which has stored therein information pertaining to a time-frequency slice representative of characteristics present at a phase transition. The present time-frequency slice (sliced in time) at the output of FFT 70 is subtracted from the stored time-frequency slice, and the resulting frequency values are squared and summed over all squared values. The resulting values are compared against a threshold in threshold element 111 which will produce, in this embodiment, an output which indicates a phase change if the threshold is exceeded.

FIG. 8 is a time-frequency profile for a PSK signal, with the signal samples being shown immediately therebelow. This time-frequency profile is generated in accordance with the present invention. As can be seen in this figure, a distinctive "cross-shaped" disturbance in the time-frequency profile is evident at the instant of phase shift. This shows that the spectrum of the time-frequency slice at the instant of phase shift is dramatically different from the time slice between phase shifts. Thus, a comparison of the output of the FFT at each time would reveal the phase shift very well. Additionally, referring to FIG. 7, a comparison of each spectrum as produced by the FFT with a template spectrum representative of the phase shift condition will serve to detect the phase shift very well. This system is less subject to noise interference than convention time-only techniques, such as quadrature detection, because white noise will have a flat, or constant, time-frequency spectrum in terms of the average estimate.

Figure 9:
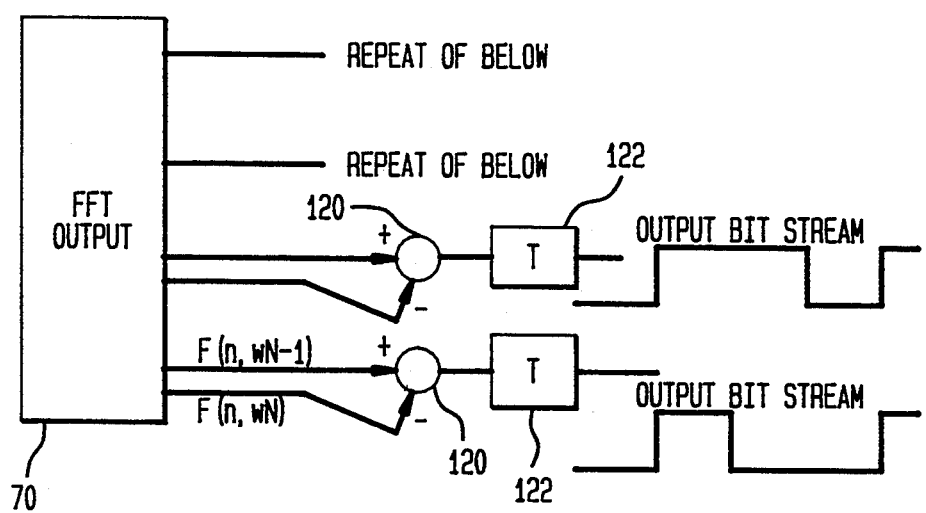
FIG. 9 is a block and line representation of a system constructed in accordance with the invention for detecting information in a signal modulated in accordance with FSK modulation.

FIG. 9 is a block and line representation of a system constructed in accordance with the principles of the invention for detecting information in a signal modulated in accordance with FSK. As shown, successive output pairs of FFT modules 70 are subtracted in subtraction elements 120 to provide a signal which varies between ±A, where A is the maximum value in a time-frequency bin. The outputs of subtraction elements 120 are conducted to threshold elements 122 which produce an output bit stream corresponding to the information in the original FSK signal.

Figure 10:
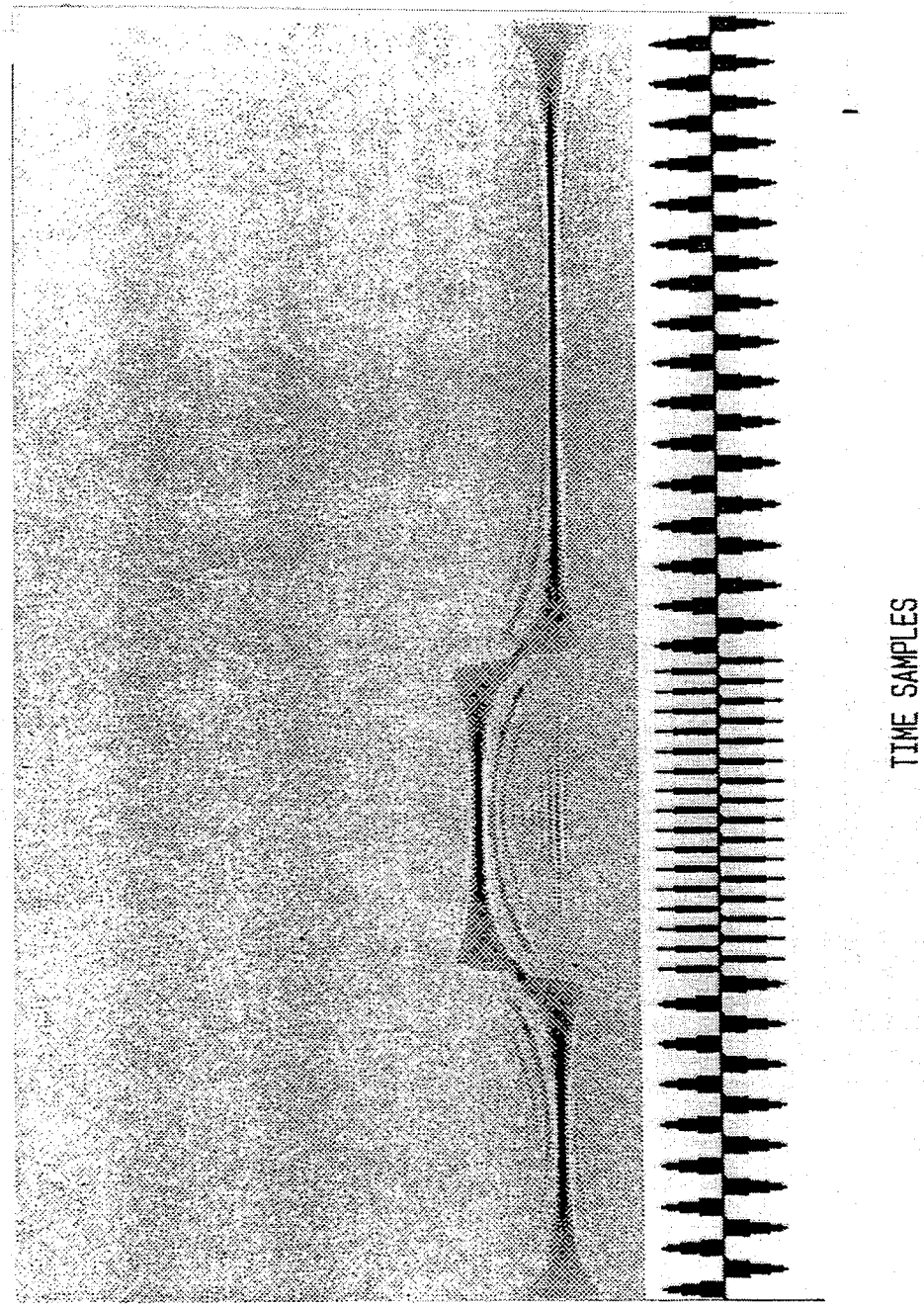
FIG. 10 is a representation of a time-frequency profile of a FSK signal, showing transitions, wherein the information is extracted in accordance with the present invention, the signal samples being shown therebelow.

FIG. 10 is a representation of a time-frequency profile of a FSK signal, showing transitions, wherein the information is extracted in accordance with the present invention, employing the system of FIG. 9. The signal samples are shown immediately below the profile. As can be seen in the profile, the energy maxima (black being a high value) shift frequency when the frequency of the signal changes. If the design were such that the maximum energy values were present in adjacent output lines of the FFT module, then subtracting the signals from these two lines would produce a signal as a function of time that toggles between ±A.

Figure 11:
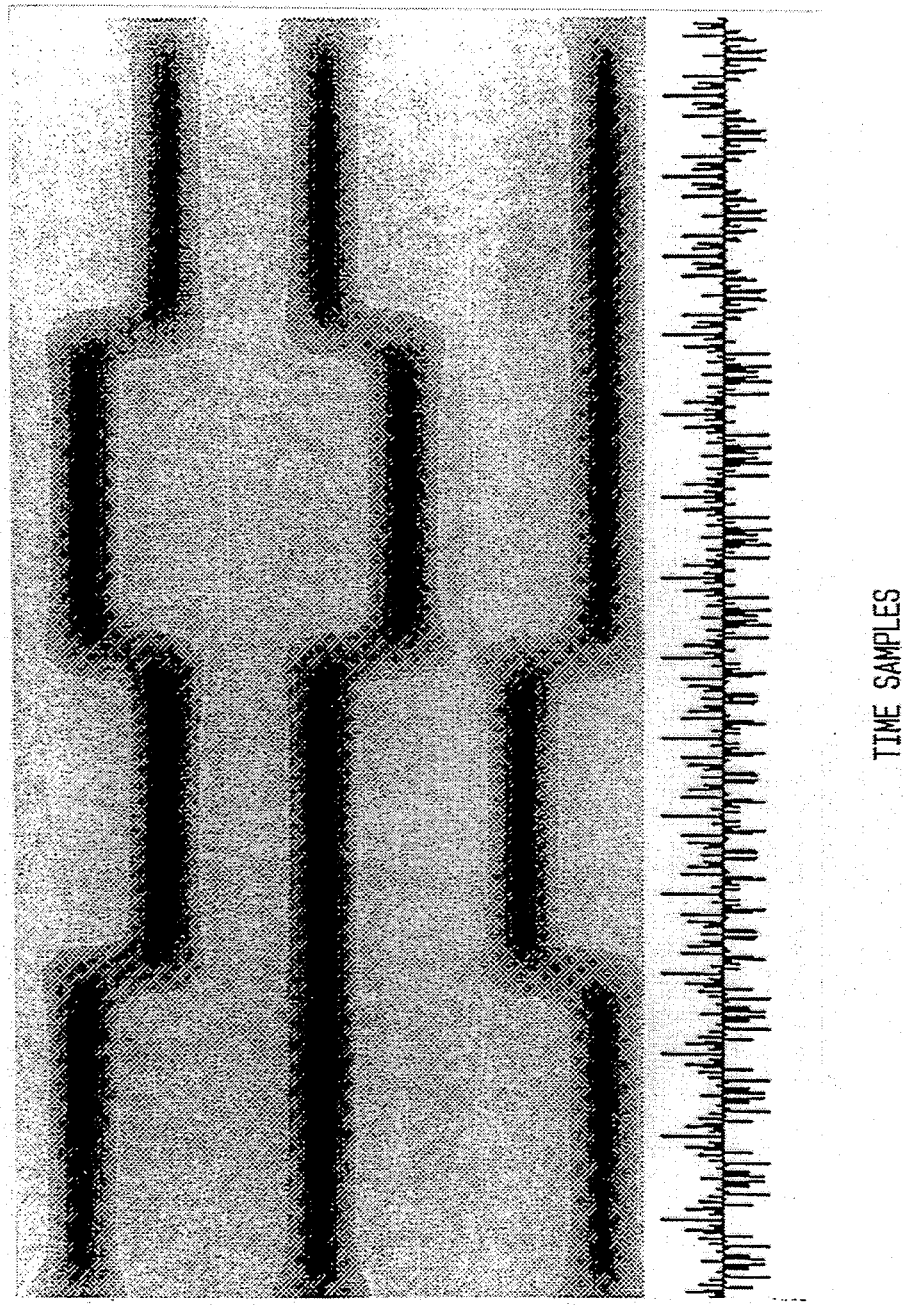
FIG. 11 is a representation of a time-frequency profile of three FSK signals, showing transitions, wherein the information is extracted in accordance with the known short spectrogram system to contrast with the present invention, the spectrogram signal samples being shown therebelow.

FIG. 11 is a representation of a time-frequency profile of three FSK signals, showing transitions, wherein the information is extracted in accordance with the known short-windowed spectrogram system to contrast with the present invention. The spectrogram signal samples are shown immediately below the profile. It is evident from this profile that there is a great deal of spread in frequency and the time transitions are blurred.

Figure 12:
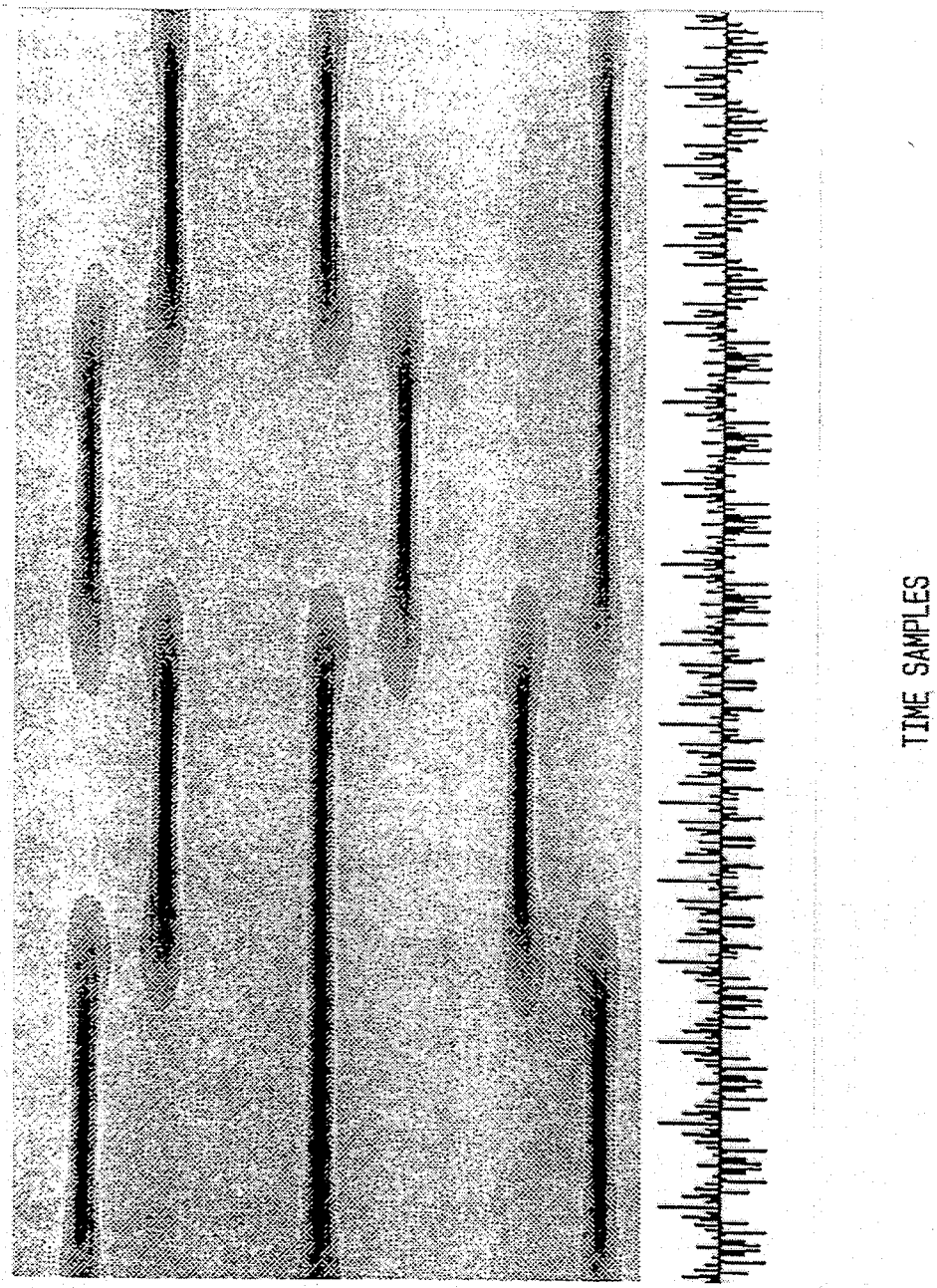
FIG. 12 is a representation of a time-frequency profile of three FSK signals, showing transitions, wherein the information is extracted in accordance with the known long spectrogram system to contrast with the present invention, the spectrogram signal samples being shown therebelow.

FIG. 12 is a representation of a time-frequency profile of the FSK signals, showing transitions, wherein the information is extracted in accordance with the known long-windowed spectrogram system. Again, the spectrogram signal samples are shown immediately below the profile. This figure shows that the frequency spread is less, but the time boundaries of the transitions overlap. This characteristic emphasizes the dilemma of conventional signal processing, and is sharply in contrast with the results achievable with the present invention. The spectrogram is often considered to be a filter bank. More specifically, one could employ a set of filters tuned to successive center frequencies, and the appropriate filter would then exhibit a high output when the signal is shifted in frequency to the particular tuned filter. The tuned filters may be designed to have very high Q values, and therefore would be sharply tuned. The FSK signals could be tightly packed in terms of their frequencies. However, high Q filters will inevitably have greater settling times. This limits the time between frequency shifts. If the filters are detuned, then they can settle more quickly to accommodate faster frequency transitions, but they have lost their ability to select closely spaced frequencies. This is a fundamental limitation of time invariant filter design. Since the RID generator of the present invention is capable of capturing the true time-frequency structure of the FSK signal, it can detect multiple FSK signals closely spaced in both time and frequency. Thus, much more information can be sent over the same channel.

Figure 13:
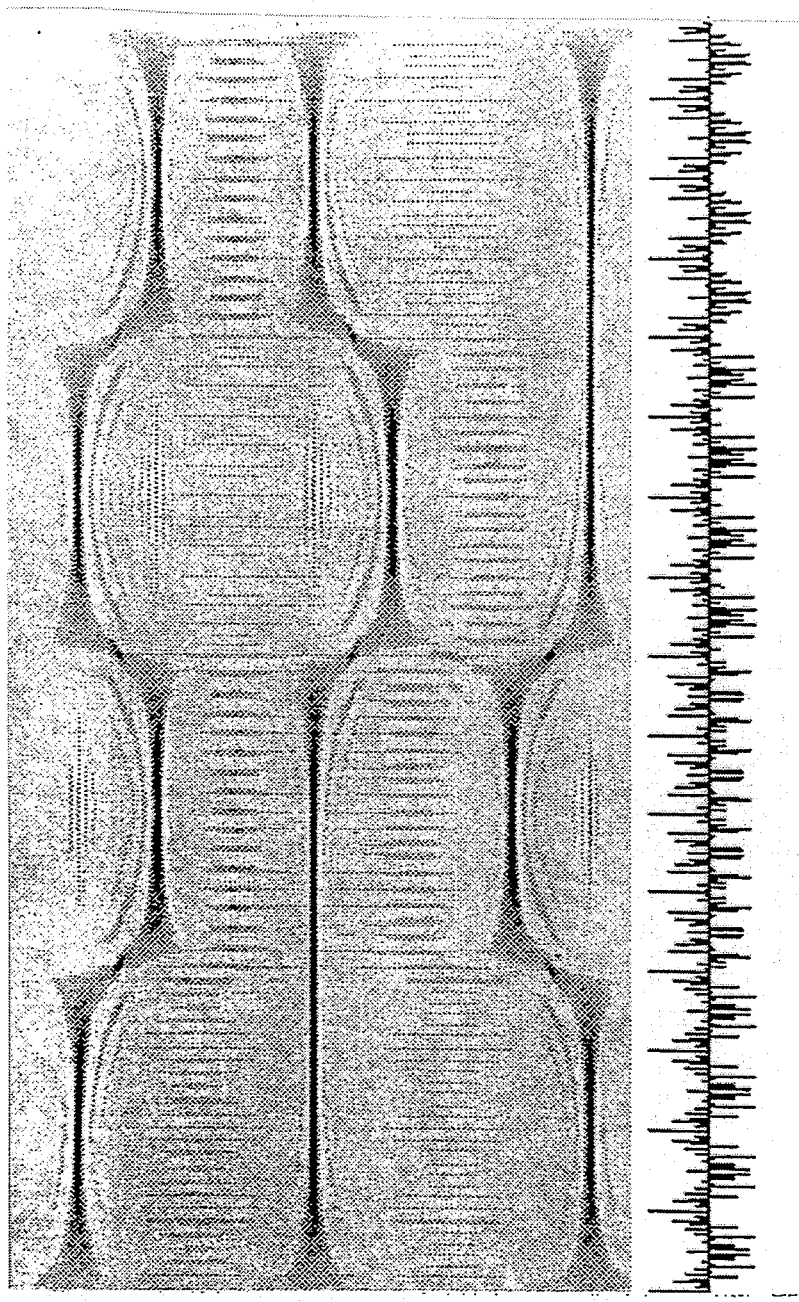
FIG. 13 is a representation of a time-frequency profile of three FSK signals, showing transitions, wherein the information is extracted in accordance with the present invention, the signal samples being shown therebelow.

FIG. 13 is a representation of a time-frequency profile of three FSK signals, showing transitions, wherein the information is extracted in accordance with the present invention. Again, the signal samples are shown immediately therebelow. This figure illustrates the sharp definition of the correct frequency between frequency shifts and the non-overlap of the transitions during frequency shifts. In the profiles of FIGS. 11-13, noise has been added to the signals. However, since the noise time-frequency spectrum tends to be flat, it does not contribute very much to the frequency shift values.

Figure 14:
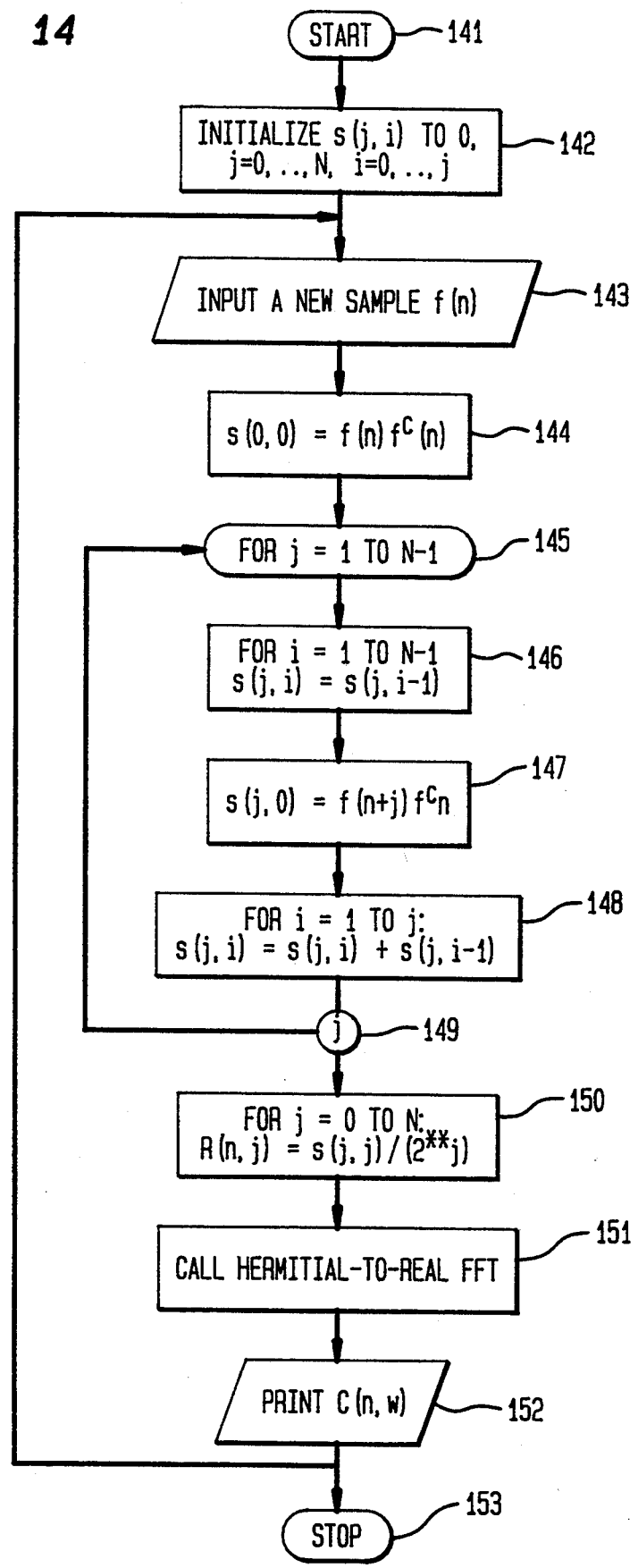
FIG. 14 is a flow diagram which is useful in describing the process of the computation of the reduced interference time-frequency distribution using the binomial kernel.

FIG. 14 is a flow diagram which is useful in describing the computation of the binomial kernel distribution. As shown therein, several system parameters are initialized at function block 142, after the system is started at function block 141. A sample is introduced at function block 143, and forms f(n). The real signal f(n) can be replaced by the analytic signal F*(n) if desired. The sample is combined multiplicatively to produce the autocorrelation s(0,0) at function block 144. The multiplicative and additive combinations are performed in the process of the loop which includes the function block steps of 145 to 149. Function block 145 permits the process to proceed to function block 147 for values of j from 1 through N. Function block 146 sets s(j,i) equal to s(j,i−1) for values of i from j to 1. Function block 147 sets s(j,O) equal to f(n+j)f$^c$(n), where f$^c$(n) denotes the complex conjugate of f(n). Function block 148 sets s(J,i) equal to s(j,i)+s(j,i−1) for values of i from 1 to j. Function block 149 determines whether the process will loop back to function block 145, depending upon the value of j being between 1 and N, or whether it will continue to function block 150, for values of j between 0 and N. The scaling associated with the binomial kernel is performed at function block 150, after which the Fourier transformation is performed at function block 151. The scaling can be done by simple register shift operations. The result of the process for the present sample may be displayed or printed or otherwise presented at function block 152, and the process is repeated for a subsequent sample.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for generating a binomial kernel responsive to a signal to be analyzed, the system comprising:
   shift means formed of a plurality of delay elements for producing successive delayed samples of a digital signal corresponding to the signal to be analyzed;
   adder means coupled to said shift means for performing an addition operation on respective ones of said successive delayed samples; and
   multiplier means coupled to said shift means for performing a multiplication operation on respective ones of said successive delayed samples, whereby the binomial kernel is produced.

2. The system of claim 1 wherein there is further provided low pass filter means having an input for receiving the electrical signal to be analyzed, and an output for producing the electrical signal to be analyzed after being filtered by said low pass filter means, for reducing aliasing distortion, said low pass filter means being coupled at its output to said shift means.

3. The system of claim 2 wherein there is further provided analog-to-digital converter means coupled between said low pass filter means and said shift means, for converting an analog output signal of said low pass filter means into said digital signal corresponding to the signal to be analyzed and providing said digital signal at an output thereof to said shift means.

4. The system of claim 3 wherein said analog-to-digital converter means comprises a sampling means for digitally sampling said analog output signal of said low pass filter means.

5. The system of claim 1 wherein there is further provided Hilbert transformer means coupled to said multiplier means for producing a transformer output signal, whereby respective delayed samples of said transformer output signal are combined with respective ones of said successive delayed samples.

6. The system of claim 5 wherein said delay elements of said shift means cause said successive delayed samples to be delayed by a period of time corresponding approximately to a time duration of a transformation produced by said Hilbert transformer means.

7. The system of claim 5 wherein said Hilbert transformer means comprises finite impulse response (FIR) filter means for performing said Hilbert transformation.

8. The system of claim 1 wherein there is further provided transformer means connected to said shift means for converting said successive delayed samples to a signal representative of the frequency domain.

9. The system of claim 8 wherein said transformer means comprises Fourier transform means for producing at an output thereof said signal representative of frequency domain.

10. The system of claim 9 wherein said Fourier transform means comprises a hermitian-to-real fast Fourier transform for converting conjugate symmetrical input data into real output data.

11. A method of generating energy distribution signals corresponding to the spectral energy content of an electrical signal to be analyzed, the method comprising the steps of:
   capturing periodically a plurality of time samples of the electrical signal to be analyzed;
   forming a plurality of autocorrelation signals corresponding to combinations of said time samples; and
   subjecting said autocorrelation signals to a transformation for producing the energy distribution signals.

12. The method of claim 11 wherein prior to performing said step of capturing there is provided the further step of subjecting the electrical signal to be analyzed to a low pass filter.

13. The method of claim 11 wherein said step of subjecting said autocorrelation signals to Fourier transformation for producing the energy distribution signals produces said signals at respective outputs of a Fourier transformer corresponding to respective frequency components, said step including the further step of providing at each of said outputs said energy distribution signals, each having real and imaginary components, said real components containing energy distribution information pertaining to respective frequency components, and said imaginary components containing energy distribution information pertaining to other frequency components.

14. The method of claim 11 wherein there is further provided the step of controlling a display device for providing a visual indication of the energy content of the electrical signal to be analyzed.

15. The method of claim 11 wherein said step of subjecting said autocorrelation signals to transformation comprises the step of subjecting said autocorrelation signals to a hermitian-to-real fast Fourier transformation.

16. The method of claim 15 wherein the energy distribution signals are real.

17. The method of claim 11 wherein said step of forming a plurality of autocorrelation signals comprises the further steps of:
   first delaying the electrical signal to be analyzed by a predetermined period of time in a plurality of delay members, said predetermined period of time corresponding to a respectively associated delay period corresponding to a respective multiple of said period of repetition of said step of capturing, whereby the electrical signal to be analyzed is produced at a plurality of respective outputs of said delay members as respective first signals;
   multiplying each of said respective first signals by a respective other one of said first signals to produce a corresponding plurality of product signals;
   further delaying each of said product signals to produce respective sequences of delayed product signal samples; and
   adding to said delayed product signal samples a prior sample of itself.

18. The method of claim 17 wherein said step of first delaying is performed using a shift register.

19. The method of claim 17 wherein prior to performing said step of multiplying there is provided the further step of forming a complex conjugate of the electrical signal to be analyzed, and there is additionally provided the step of further multiplying at least one of said first signals by said complex conjugate.

20. The method of claim 17 wherein said step of multiplying is performed in a singular multiplication element, and there are provided the further steps of:
   multiplexing said first signals to form a sequence thereof at an input of said singular multiplication element; and
   demultiplexing a sequence of product signals at an output of said singular multiplication element.

21. A method of generating energy distribution signals corresponding to the spectral energy content of an electrical signal to be analyzed, the method comprising the steps of:
   capturing periodically a plurality of time samples of the electrical signal to be analyzed;
   combining multiplicatively delayed ones of said samples to form a plurality of sequences of product signal samples;
   combining product signal samples additively within each of said sequences of product signal samples, for forming from each such sequence an autocorrelation signal; and
   subjecting said autocorrelation signals to a transformation for producing the energy distribution signals.

22. The method of claim 21 wherein prior to performing said step of combining multiplicatively there is provided the further step of multiplexing said time samples of the electrical signal to be analyzed.

23. The method of claim 21 wherein prior to performing said step of combining product signal samples additively there is provided the further step of demultiplexing said sequences of product signal samples.

24. The method of claim 21 wherein there is further provided the step of controlling a display device in response to the energy distribution signals for providing a visual indication of the energy content of the electrical signal to be analyzed.

25. The method of claim 21 wherein said steps of combining multiplicatively delayed ones of said samples and combining product signal samples additively comprise the step of autocorrelating the electrical signal to be analyzed in accordance with a binomial mathematical expression of the form:

$$\psi(m,k) = \binom{k}{m} 2^{-k}, m = 0, 1, \ldots k, \text{ and } k = 0, 1, 2, \ldots N$$

where said mathematical expression corresponds to a binomial kernel.

26. A method of producing a signal responsive to phase transitions in an information signal modulated in accordance with a phase shift keying modulation scheme, the method comprising the steps of:
   storing in a memory data corresponding to a reference time-frequency slice characteristic of a phase transition in an information signal;
   capturing periodically a plurality of time samples of the information signal;
   combining multiplicatively delayed ones of said samples to form a plurality of sequences of product signal samples;
   combining product signal samples additively within each of said sequences of product signal samples, for forming from each such sequence an autocorrelation signal;
   subjecting said autocorrelation signals to Fourier transformation for producing energy content signals containing information responsive to the phase transitions, said energy content signals being functionally related to time and frequency;
   extracting a subject time-frequency slice of said energy content signals; and
   comparing said subject time-frequency slice against said reference time frequency slice stored in said memory for detecting the occurrence of said phase transition.

27. The method of claim 26 wherein said step of comparing comprises the step of subtracting said subject time-frequency slice from said reference time frequency slice stored in said memory to produce a sequence of difference values.

28. The method of claim 27 wherein said step of comparing comprises the further steps of:
   squaring said difference values; and
   summing said squared difference value.

29. The method of claim 28 wherein there is provided the further step of comparing said summed squared difference values against a threshold value.

30. A method of producing an output bit stream responsive to an information signal modulated in accordance with a frequency shift keying modulation scheme, the method comprising the steps of:
   capturing periodically a plurality of time samples of the information signal;
   combining multiplicatively delayed ones of said samples to form a plurality of sequences of product signal samples;
   combining product signal samples additively within each of said sequences of product signal samples, for forming from each such sequence an autocorrelation signal;
   first subjecting said autocorrelation signals to transformation for producing a plurality of energy content signals at respective frequency-related outputs;
   combining subtractively respective pairs of said energy content signals for producing respective difference signals; and
   second subjecting each of said difference signals to a respective threshold element for producing the output bit stream responsive to the information in the information signal.

31. The method of claim 30 wherein in performing said step of combining subtractively, said respective pairs of said energy content signals are adjacent to one another in frequency.

32. The method of claim 31 wherein there is provided the further step of controlling a display device in response to said output bit stream.

33. A system for producing a time-frequency distribution signal corresponding to an electrical signal to be analyzed, the electrical signal having a spectral characteristic which is desired to be analyzed with respect to time, the system comprising:
   sample means for producing time samples of the electrical signal to be analyzed:
   local correlator means for producing an autocorrelated signal, said local correlator means being formed of:
      a plurality of delay elements arranged in sequence for producing cumulative delay of said time samples; and
      a plurality of multiplier means for combining multiplicatively respective ones of said time samples with others of said time samples in other states of delay, and producing a locally correlated sequence of samples; and
   binomial transformer means formed of a plurality of correlator elements, said binomial transformer means being formed of a plurality of banks of said correlator elements, each of said banks being associated with a respective one of said plurality of multiplier means, for producing the time-frequency distribution signal responsive to the spectral characteristic of the electrical signal to be analyzed.

34. The system of claim 33 wherein there is provided conjugate former means coupled to at least one of said plurality of multiplier means for forming a conjugate of said cumulatively delayed time samples, said conjugate being combined multiplicatively in said multiplier means.

35. The system of claim 33 wherein there is provided Fourier transform means having an input coupled to said binomial transformer means, and an output for producing at least one signal responsive to the time-frequency distribution of the electrical signal to be analyzed.

36. The system of claim 33 wherein said plurality of delay elements in said local correlator means comprise respective sequential stages of a shift register, said shift register being coupled at an input thereof to a respective one of said plurality of multiplier means.

37. The system of claim 33 wherein said correlator elements in said binomial transformer means are each comprises:
   delay means for delaying in time a sample in said associated locally correlated sequence of samples; and
   combiner means for combining ones of said samples in said correlated sequence of samples with others of said samples in said correlated sequence of samples in other states of delay.

38. The system of claim 37 wherein said combiner means each comprise adder means for combining said samples additively.

39. The system of claim 33 wherein each of said banks of said correlator elements has a respective, different number of said correlator elements arranged sequentially therein.

40. The system of claim 39 wherein said numbers of said correlator elements in said banks differ sequentially by one correlator element.

41. The system of claim 39 wherein there is provided a plurality of delay members, each arranged sequentially intermediate of respectively associated ones of said banks and said multiplier means.

* * * * *

UNITED STATES PATENT AND TRADEMARK OFFICE
CERTIFICATE OF CORRECTION

PATENT NO. : 5,412,589
DATED : May 2, 1995
INVENTOR(S) : William J. Williams, et al.

It is certified that error appears in the above-identified patent and that said Letters Patent is hereby corrected as shown below:

Column 2, line 22, delete "$P(t,\omega) = \frac{1}{4\pi^2} \iiint e^{-j\theta t - jr\omega + u\Theta u} \phi(\Theta, r) s^c(u-\tfrac{1}{2}r) s(u+\tfrac{1}{2}r) du dr \, \Theta$"

and insert -- $P(t,\omega) = \frac{1}{4\pi^2} \iiint e^{-j\theta t - jr\omega + u\Theta u} \phi(\Theta, r) s^*(u-\tfrac{1}{2}r) s(u+\tfrac{1}{2}r) du dr d\Theta$ --.

Column 10, line 13, delete "convertor" and insert --converter--.

Column 11, line 41, delete "and" and insert --an--.

Column 14, line 9, delete "F*(n)" and insert --f*(n)--.

Column 14, line 20, delete "s(J,i)" and insert --s(j,i)--.

Column 18, line 62, delete "are".

Signed and Sealed this

Eleventh Day of March, 1997

*Attest:*

BRUCE LEHMAN

*Attesting Officer*     Commissioner of Patents and Trademarks